(12) United States Patent
Hedley et al.

(10) Patent No.: US 6,640,408 B2
(45) Date of Patent: Nov. 4, 2003

(54) DEVICE AND METHOD FOR REMOVAL/INSTALLATION OF A VEHICULAR COMPONENT

(75) Inventors: Robert Ian Hedley, Milbrodale via Singleton (AU); Scott Johnson, Mt. Thorley via Singleton (AU)

(73) Assignee: Jostoy Pty Ltd., Mt. Thorley via Singleton (AU)

(*) Notice: Subject to any disclaimer, the term of this patent is extended or adjusted under 35 U.S.C. 154(b) by 0 days.

(21) Appl. No.: 09/949,450

(22) Filed: Sep. 7, 2001

(65) Prior Publication Data

US 2002/0078546 A1 Jun. 27, 2002

(30) Foreign Application Priority Data

Sep. 8, 2000 (AU) ............................................. PR0004

(51) Int. Cl.[7] ................................................ B25B 27/14
(52) U.S. Cl. .................... 29/281.1; 29/426.1; 269/296; 254/14
(58) Field of Search ........................ 29/402.08, 426.1, 29/252, 281.1; 269/130, 296; 254/14, 134, DIG. 16

(56) References Cited

U.S. PATENT DOCUMENTS

| | | | | |
|---|---|---|---|---|
| 2,747,837 A | * | 5/1956 | Turner | 254/134 |
| 2,748,459 A | * | 6/1956 | Orr | 269/296 |
| 2,838,278 A | * | 6/1958 | Johnsen | 254/134 |
| 2,896,909 A | * | 7/1959 | Taylor | 254/9 R |
| 2,903,258 A | * | 9/1959 | Jovanovich | 269/296 |
| 2,908,492 A | * | 10/1959 | Stephenson et al. | 269/101 |
| 2,940,611 A | * | 6/1960 | Burch | 414/728 |
| 3,028,145 A | * | 4/1962 | Brand | 254/134 |
| 3,040,908 A | * | 6/1962 | Johnson | 414/743 |
| 3,062,500 A | * | 11/1962 | Arnes et al. | 254/7 B |
| 3,136,526 A | * | 6/1964 | Wolf | 254/10 C |
| 3,559,981 A | * | 2/1971 | Abshear | 269/130 |
| 3,633,679 A | * | 1/1972 | Dahlberg et al. | 172/123 |
| 3,782,688 A | * | 1/1974 | Scott | 254/2 R |
| 4,269,394 A | * | 5/1981 | Gray | 254/134 |
| 4,445,667 A | * | 5/1984 | Webb | 254/134 |
| 4,549,722 A | * | 10/1985 | Gagliano | 254/134 |
| 4,558,849 A | * | 12/1985 | Luening et al. | 254/134 |
| 4,570,905 A | * | 2/1986 | Gerstner | 254/134 |
| 4,691,904 A | * | 9/1987 | Armstrong | 269/17 |
| 4,787,600 A | * | 11/1988 | Bode | 254/126 |
| 5,251,875 A | * | 10/1993 | Craychee et al. | 254/8 B |
| 5,360,311 A | * | 11/1994 | Lutz et al. | 414/494 |
| 5,372,353 A | * | 12/1994 | West | 254/10 B |
| 5,566,999 A | * | 10/1996 | Goettl | 294/103.1 |
| 6,089,545 A | * | 7/2000 | Norman et al. | 254/134 |
| 6,168,138 B1 | * | 1/2001 | Dhein | 254/134 |
| 6,170,141 B1 | * | 1/2001 | Rossway et al. | 29/281.1 |
| 6,292,999 B1 | * | 9/2001 | Rossway et al. | 29/559 |
| 6,322,061 B1 | * | 11/2001 | Maser et al. | 269/17 |
| 6,457,700 B1 | * | 10/2002 | Hong | 254/8 B |
| 6,533,247 B1 | * | 3/2003 | Dhein | 254/134 |

\* cited by examiner

Primary Examiner—Gregory Vidovich
Assistant Examiner—Essama Omgba
(74) Attorney, Agent, or Firm—McAfee & Taft

(57) ABSTRACT

A device and method for removing or installing a vehicular component, such as a transmission or differential, from a vehicle. The device (1) includes a trolley (2) having an actuation means (3) thereon. A saddle like device (14) is engaged with the vehicular component (9), the saddle (14) utilizing a self-aligning guide channel (38) and roller (19) locating and engaging system. Once attached, the vehicular component (9) may be uniquely manoeuvred via the underside of the vehicle, effected by a pair of articulated arms (24) and (25) operated by a plurality of hydraulic cylinders (31) and (32) to achieve the required movement of the arms (24) and (25). The trolley may then be moved from under the vehicle, such that the transmission, differential or other vehicular component may then be easily accessed for servicing.

11 Claims, 10 Drawing Sheets

DEVICE AND METHOD FOR REMOVAL/ INSTALLATION OF A VEHICULAR COMPONENT

BACKGROUND OF THE INVENTION

The present invention relates to a device and method for the removal and/or installation of a vehicular component from a vehicle. In particular, the present invention relates to a such a device and a method for removal, whereby a vehicular component, such as a transmission or differential unit may be removed via the underside of a vehicle.

DESCRIPTION OF THE PRIOR ART

The removal of vehicular components, such as transmission units and differentials from trucks, tractors, graders, earthmoving and mining equipment, such vehicles typically being quite large in size, is a necessary function for servicing of such components. The removal of such components to date has typically been done by means of cranes and other similar devices to extract the components in a direction substantially upwardly from the vehicle.

This not only requires specialised equipment, but is also somewhat dangerous in that persons are required to work at elevated positions. In recent times in Australia, the requirement of workers to work at such elevated positions have come to issue with regulatory occupational health and safety authorities, which authorities now require the use of harnesses, railings, etc., to ensure the improved safety of such workers. Consequently, the expense of utilising such equipment for the removal of the vehicular components from the vehicles for servicing and the like, has been even further increased.

SUMMARY OF THE INVENTION

The present invention seeks to provide a device and method for the removal and/or installation of a vehicular component, such as a differential or transmission unit, from a vehicle, whereby, by use of the device and method of the present invention, the component is manocuvred underneath the vehicle.

In one broad form, the present invention provides a device for removal/installation of a vehicular component from a vehicle, said device including:

trolley means, for movement of said device over a substrate surface;

actuation means, a first end of which is attached to said trolley means, and, a second end of which is adapted to be connected to said vehicular component;

whereby, when said vehicular component is attached to said second end of said actuation means, said vehicular component is manoeuvred between an installed position where said vehicular component is installed on said vehicle, and, an uninstalled position where said vehicular component is provided substantially on said trolley means for movement below said vehicle.

Preferably, said vehicle is a truck, tractor, earthmoving or mining equipment, and, said vehicular component is a differential, transmission unit or other vehicular component.

Also preferably, said actuation means includes a pair of articulated arms, one on substantially each side of said trolley means.

In its preferred form, each of said arms includes a plurality of pivotally connected arm members.

Preferably, each said member is movable by means of an actuator, such as a hydraulic cylinder, a motor or other actuator.

Also preferably, said second end of said actuation means is adapted to be connected to said vehicular component in a removable manner, such as means of any one or combination of bolt(s), screw(s), a clamp(s), or other removable means.

In a preferred embodiment, said second end of said actuation means is adapted to be connected to said vehicular component in a removable manner to said vehicular component by means of a saddle device.

In this preferred form, preferably, said vehicular component is a transmission unit whereby said saddle device includes a pair of spaced apart saddle components adapted to surround said transmission unit and be bolted or otherwise attached to flanges provided therearound.

In another preferred embodiment, said second end of said actuation means is adapted to be connected to a differential unit by means of an adaptor of complementary shape and be adapted thereto by any one or combination of bolt(s), screw(s), clamp(s).

In a preferred embodiment of the invention, said trolley is substantially elongated and lowstrung in shape, and is provided with wheels, rollers or the like for the movement thereof over the substrate surface.

In a further broad form, the present invention provides a method of removing a vehicular component from a vehicle using the device as hereinbefore defined, said method including the steps of:

providing said trolley means into a position substantially below said vehicular component;

operating said actuation means such that said second end thereof is positioned substantially proximal to said vehicular component;

attaching said second end of said actuation means to said vehicular component, for example, by bolts, screws, clamps and/or the like;

removing said vehicular component from said vehicle, by operating said actuation means to manoeuvre said vehicle component to a position substantially onto said trolley means; and, removing said trolley means, with said vehicular component, from underneath said vehicle.

In a further broad form, the present invention provides a method of installing a vehicular component from a vehicle using the device as hereinbefore described, said method including the steps as hereinbefore recited but performed in the reverse order.

BRIEF DESCRIPTION OF THE DRAWINGS

The present invention will become more filly understood from the following detailed description of a preferred but non-limiting embodiment thereof, described in connection with the accompanying drawings, wherein:

FIG. 2 illustrates, in FIGS. 2(a), 2(b) and 2(c) thereof, various views of the transmission unit, FIGS. 2(a) and 2(b) illustrating alternative isometric views, whilst, FIG. 2(c) illustrating an elevational view of the transmission unit;

FIG. 3, in FIGS. 3(a), 3(b) and 3(c), illustrate a "saddle" which may be utilised in the device of FIG. 1 to support the transmission unit shown in FIG. 2, FIGS. 3(a) and 3(b) illustrating alternative isometric views of the saddle, and, FIG. 3(c) illustrating an elevational view thereof;

DETAILED DESCRIPTION OF PREFERRED EMBODIMENTS

Throughout the drawings, like numerals will be used to identify similar features, except where expressly otherwise indicated.

Figure 1:
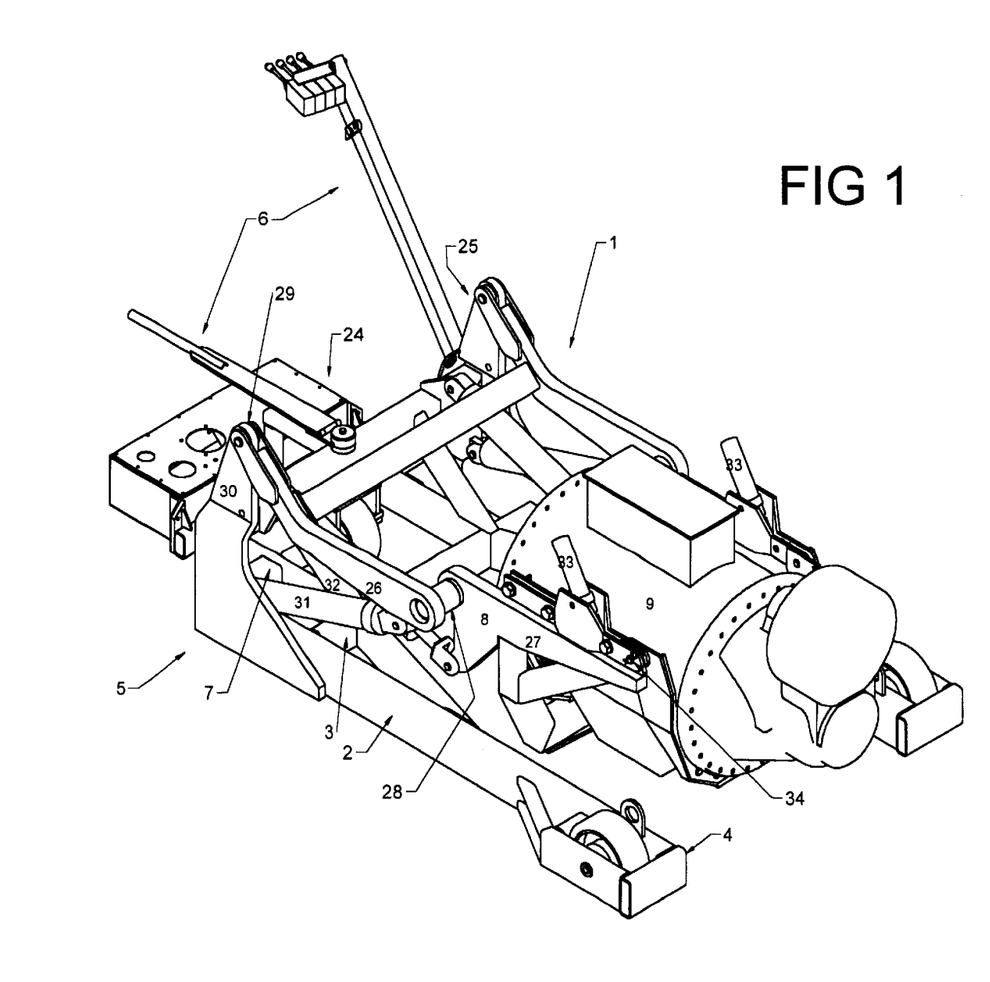
FIG. 1 illustrates an isometric view of a device in accordance with the present invention, supporting a transmission unit.

As shown in FIG. 1, the device for removal and/or installation of a vehicular component from a vehicle, is generally referenced by numeral 1, and includes a trolley means 2, supporting an actuation means 3.

Figure 6A:
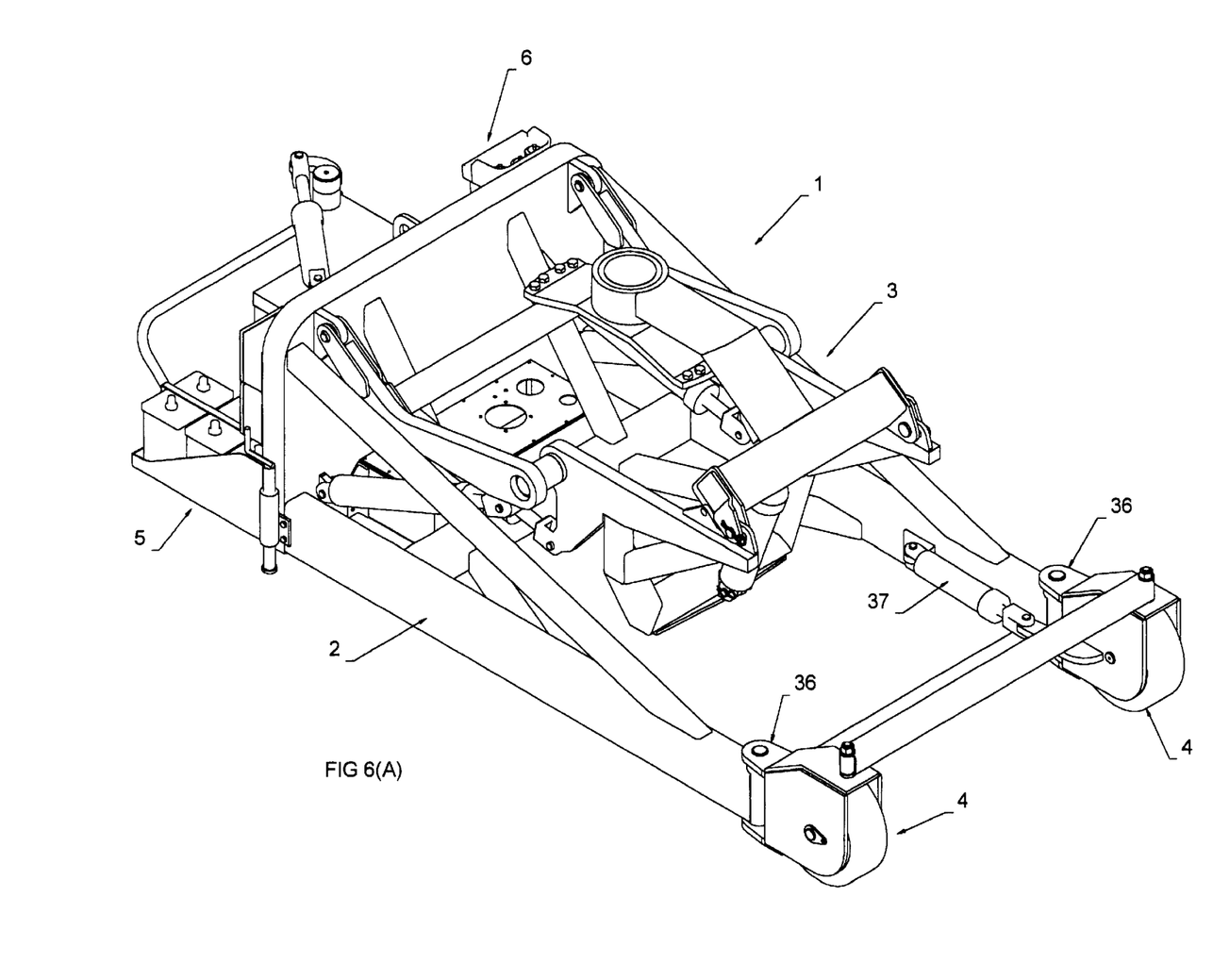
Figure 6B:
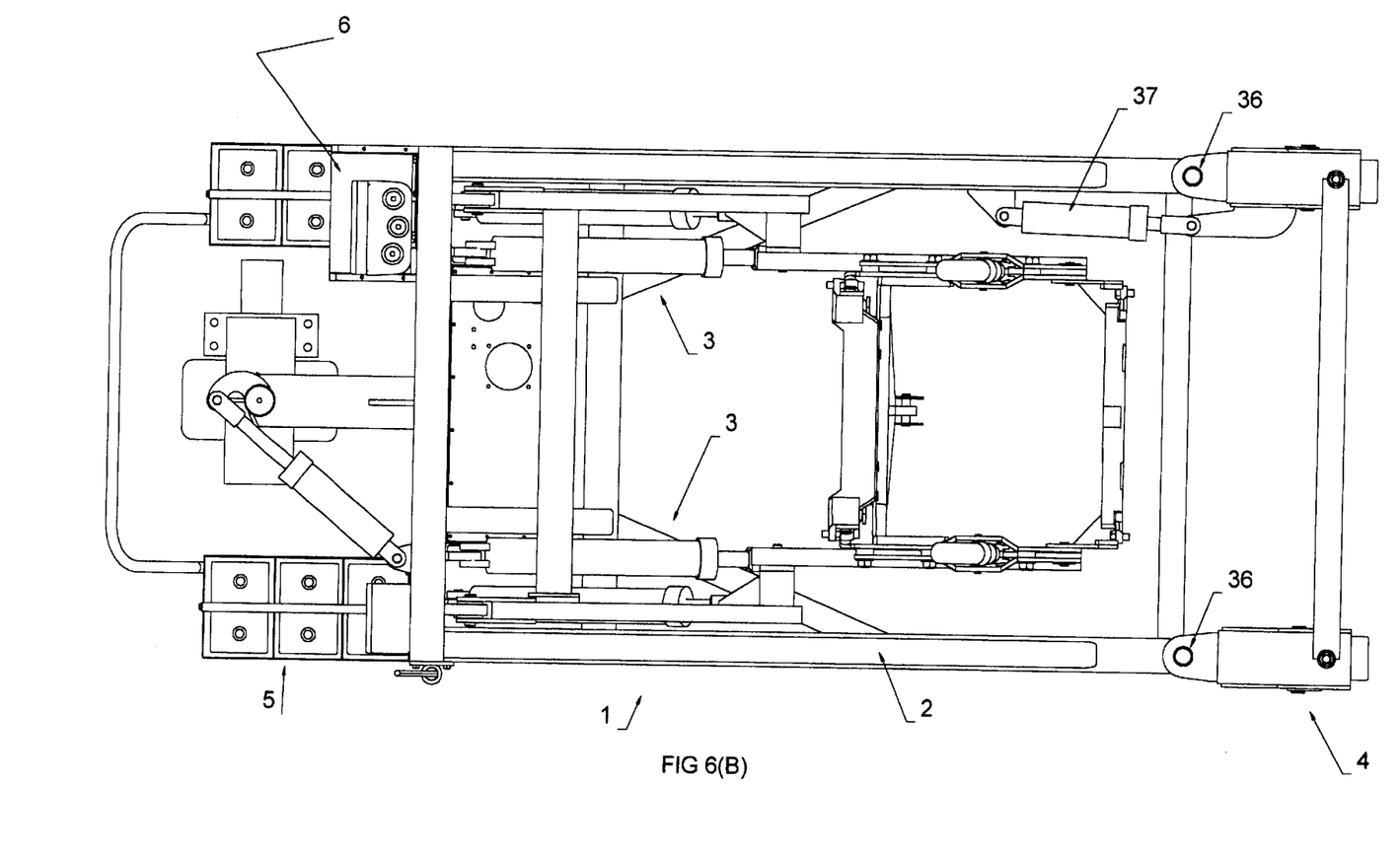

The trolley is embodied as a substantially elongate device having wheels or rollers at a first end 4 thereof, and also at a second end 5 thereof (not shown). The trolley is therefore formed of a substantially elongate lowstrung frame member which is adapted for travel over a substrate surface. The travel of the trolley may either be performed manually, i.e. by being pushed, or, it may be motorised. Appropriate controls 6 may be provided at a convenient location to be activated by an operator. In a preferred form, at least one of the sets of wheels or rollers provided at one end of the trolley is pivotal, for steering movement of the trolley, as desired, for optimal positioning of the trolley. This is illustrated in the embodiment of FIG. 6, where the front wheels 4 are pivoted at pivots 36, being actuated by steering actuator 37.

Figure 2A:
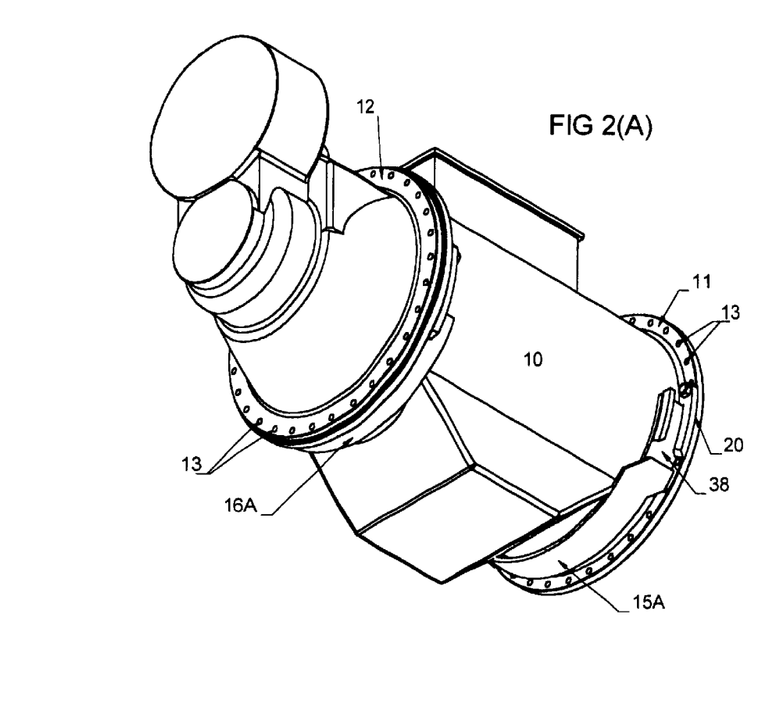
Figure 2B:
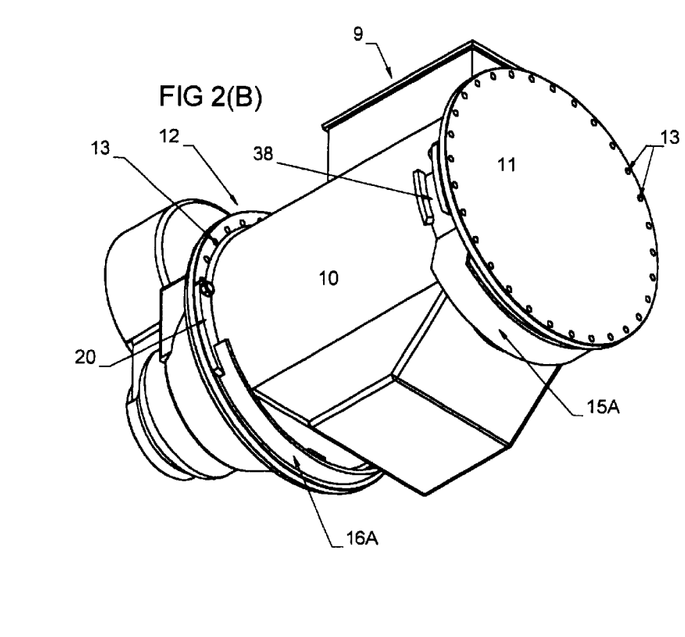
Figure 2C:
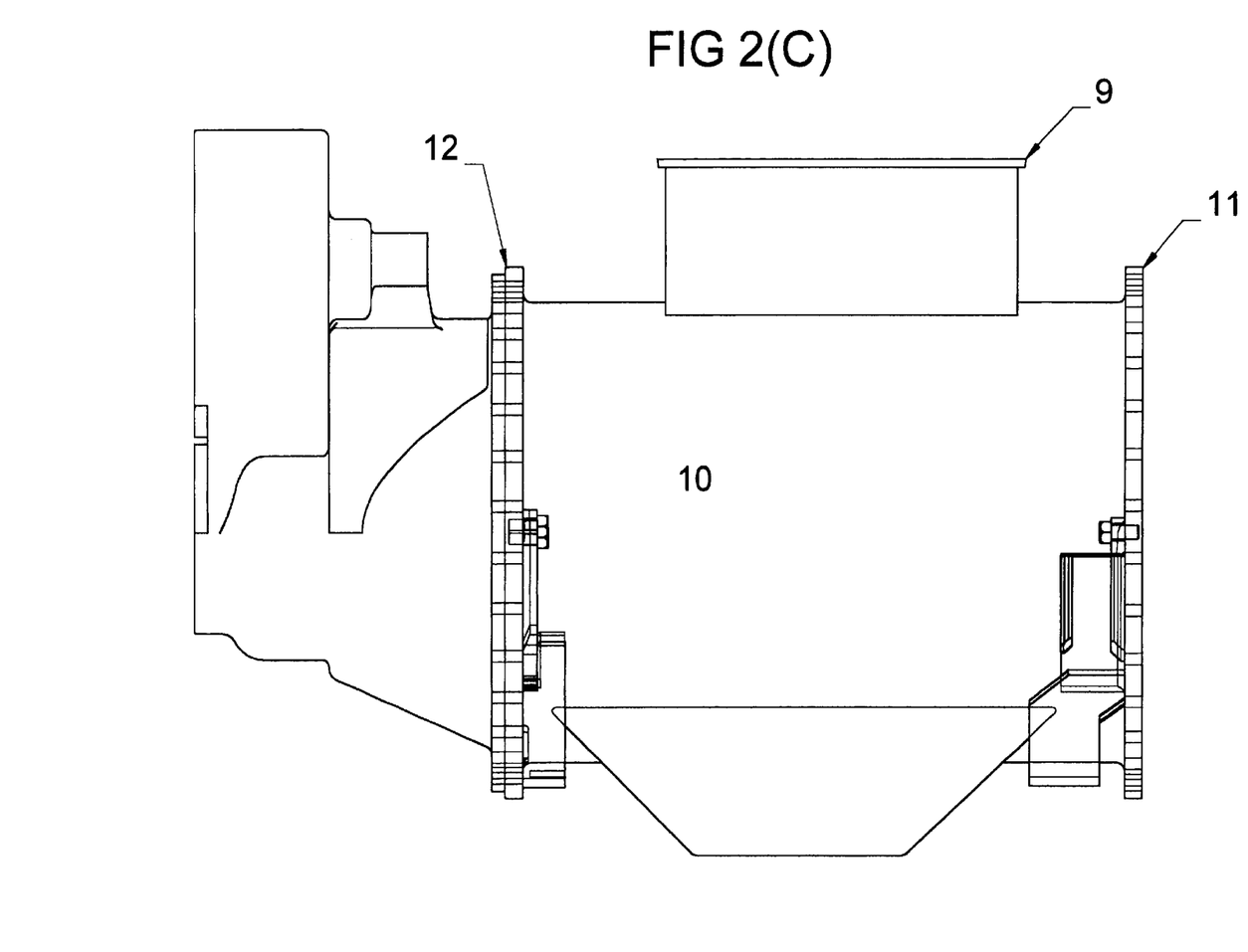

The actuation means 3 includes a first end thereof 7, which is adapted to be connected to the trolley means 2, and, a second end thereof 8 which is adapted to be connected to the vehicular component. The vehicular component illustrated in FIG. 1 is a transmission unit 9. Further views of the transmission unit 9 are illustrated in FIG. 2, where it can be seen that the transmission unit 9 includes a main body portion 10 having a pair of flanges 11 and 12 at opposed ends thereof, each of which are typically provided with a plurality of bolt holes 13.

Figure 3A:
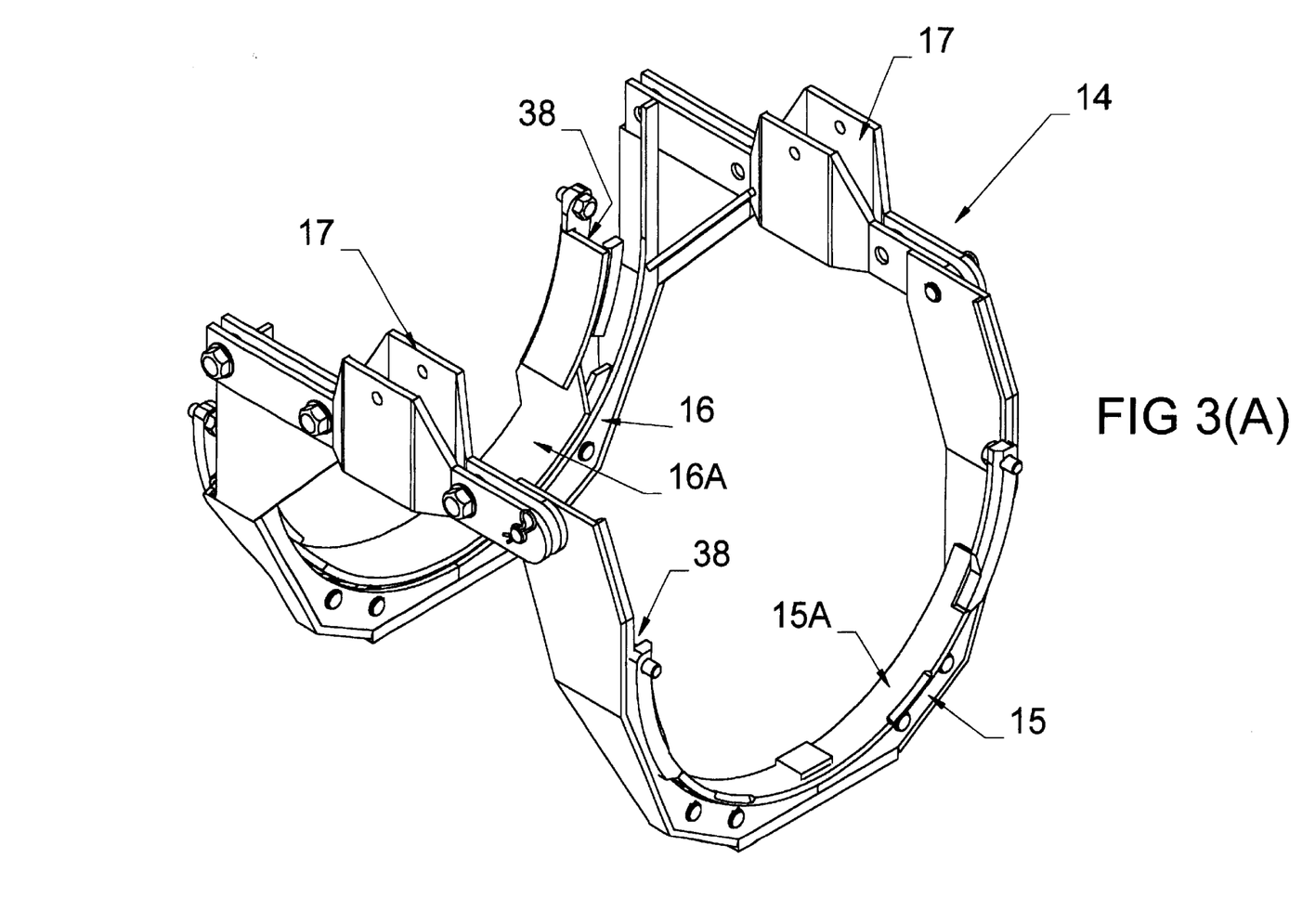
Figure 3B:
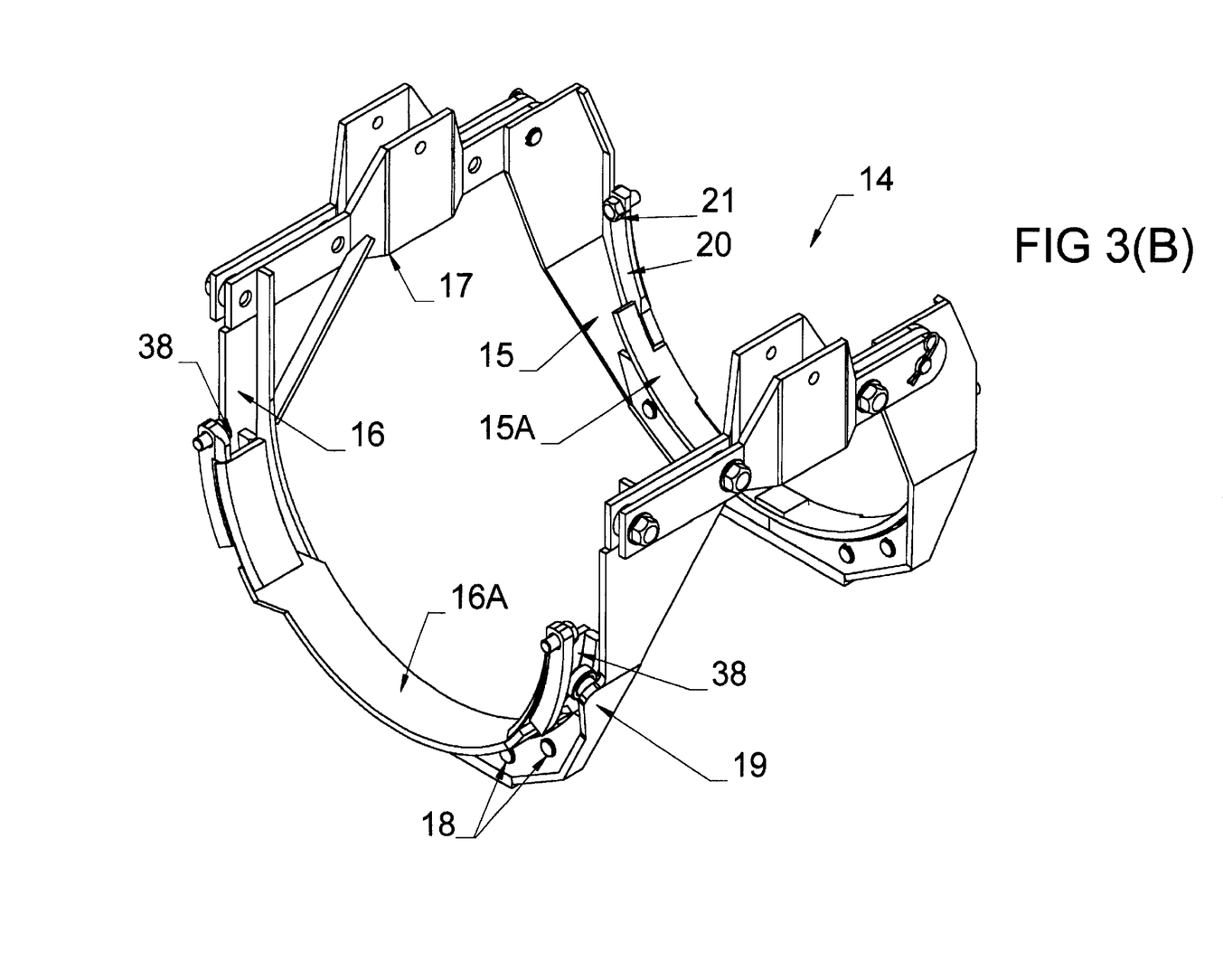
Figure 3C:
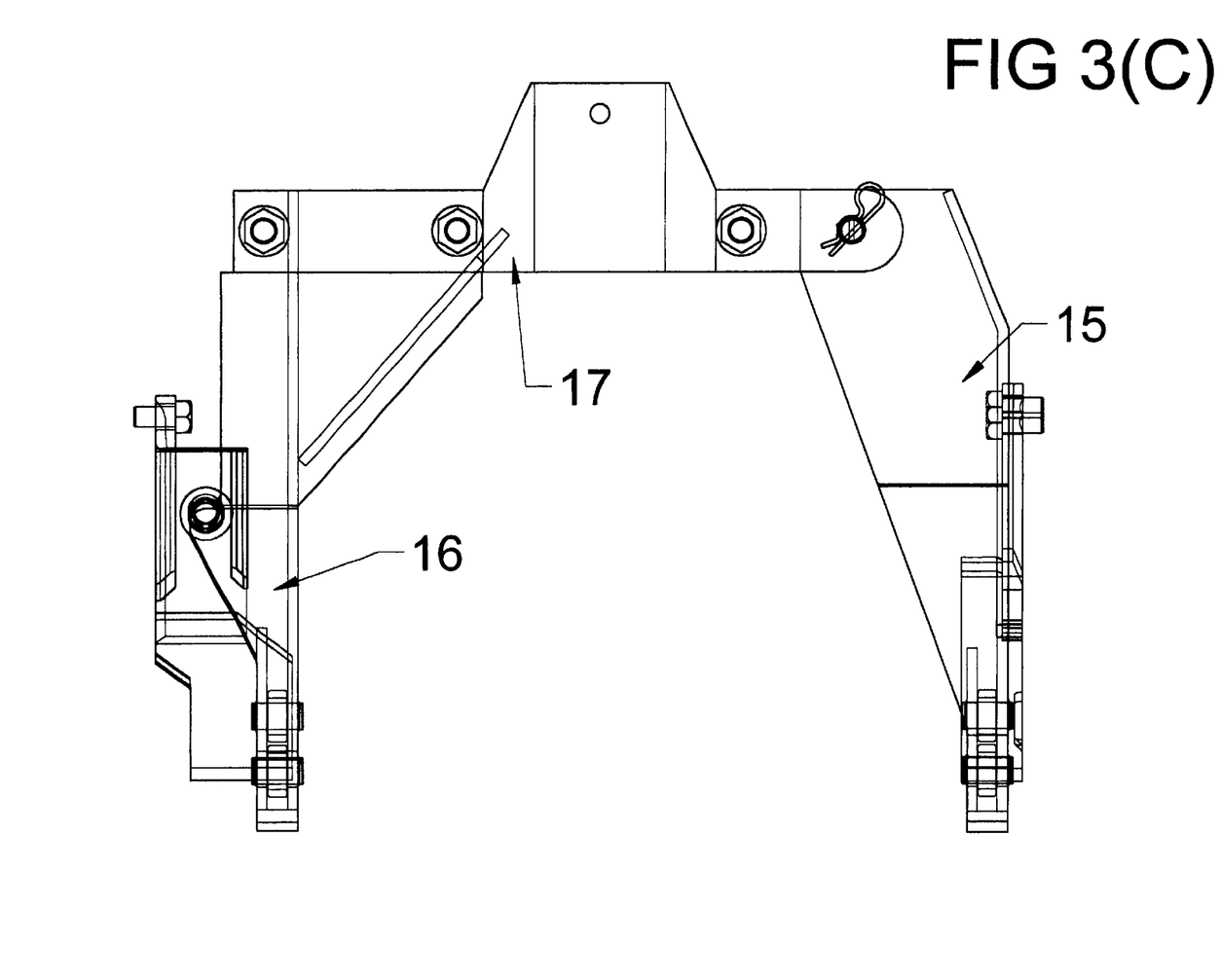

The mode by which the transmission unit may be attached to the second end 8 of the device 1 in accordance with the present invention may be via a variety of attachment mechanisms. A suitable attachment mechanism or 'saddle' 14 is shown in FIG. 3, wherein FIGS. 3(a) and 3(b) illustrate alternative isometric views thereof, and, FIG. 3(c) illustrates an elevational view thereof. The attachment mechanism illustrated in FIG. 3, embodied in the form of a saddle device 14 has a pair of saddle arms 15 and 16 connected via an intermediate portions 17. As will be appreciated, the saddle device 14 is adapted to effectively straddle the underside of the transmission unit 9 and support same thereby. Firstly, the guide sleeves 15a and 16a are bolted to the flanges 11 and 12 respectively via bolt holes 13. As will be seen, each of the guide sleeves 15a and 16a includes a guide channel 38 which are adapted to locate and receive rollers 19 as the saddle 14 (attached to the device 1) is brought into engagement with the transmission unit 9. This, of course, greatly simplifies the attachment of the transmission unit 9 to the device 1 by effectively performing a self-centering function. Without this, alignment of the attachment means of the device 1 to the transmission unit 9 would be considerably more complex and tedious requiring precise alignment of bolt holes or the like for insertion of bolts therethrough.

A variety of rollers, including axial constraint rollers 18 and lateral constraint rollers 19 may be provided to permit rotation of the transmission whilst it is supported thereby. Appropriate engagement means, such as illustrated by reference numeral 20 may be provided to abut the flanges 11 and 12, and for connection of the transmission unit to the saddle thereby, by provision of suitable bolts or the like device through bolt holes 21 and 13 (on flanges 11 and 12).

Figure 4:
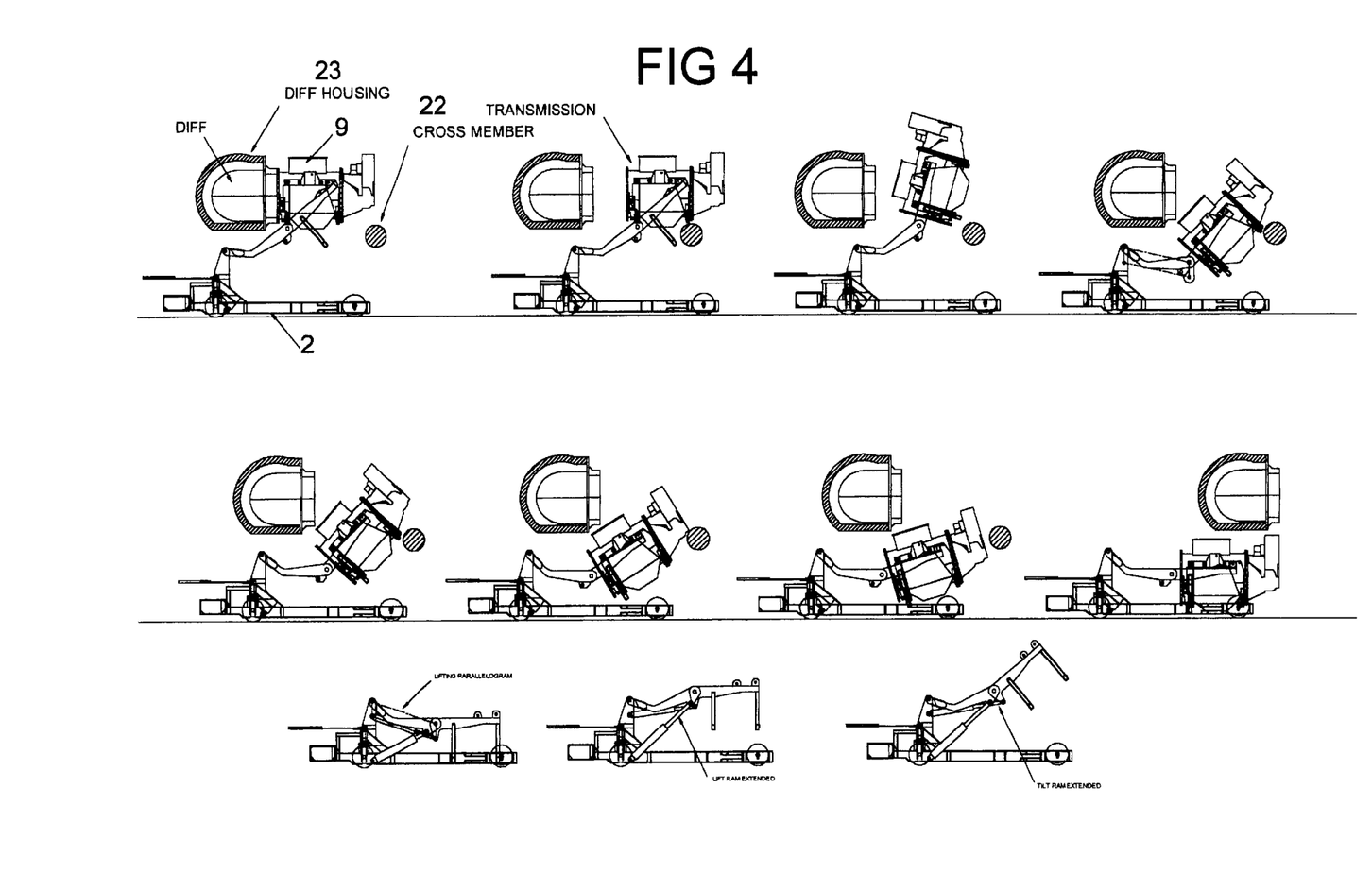
FIG. 4 illustrates the various steps by which a transmission unit may be extracted from the vehicle utilising the device of the present invention.

The manner by which the transmission unit may be manoeuvred from its installed position on the vehicle to a position remote from the vehicle, whereat it may be serviced or the like, is illustrated in FIG. 4. As will be appreciated, the vehicle has various components such as cross-member 22 and differential housing 23, past which the transmission unit 9 must be manoeuvred from the installed position to the position substantially on the trolley 2, such as illustrated in the various representations shown in FIG. 4.

This manoeuvring is basically performed by selective movement of the various articulated arm members which combine to form the actuation means. The illustrated embodiments shows that the actuation means includes a pair of articulated arms 24 and 25 on opposed sides of the trolley 2 (see FIG. 1). Each articulated arm is shown to include a plurality of pivotally connected arm members. For example, arm 24 includes a first arm member 26 and a second arm member 27 connected by pivot 28. Arm member 26 is attached via pivot 29 to support 30, which itself is attached to trolley means 2. A further pivot point 34 enables further pivotal movement of the device by operation of cylinder 33. Hydraulic cylinders, or other actuating means, such as motors, may be then operated to provide the appropriate pivotal activation of arms 27 and 28, such that they may be used to manoeuvre the transmission unit 9 from its installed position on to the trolley means 2, such as shown in FIG. 4. Appropriate hydraulic cylinders 31, 32 and 33 are illustrated in FIG. 1 for this purpose. FIG. 4 also illustrates the basic lifting parallelogram which enables such functional movement, the movement being achieved by extension of the lift ram 31, and, the tilt ram 32 being extended to control the relative movement of arms 26 and 27.

It will therefore be appreciated that by appropriate movement of the arms via the hydraulic cylinders or the like, the vehicular component, being the transmission shown in FIG. 4, may be removed from a vehicle by means of firstly providing a trolley in to a position substantially below the vehicular component, operating the actuation means such that the second end thereof is positioned substantially proximal to the vehicular component, in this case the transmission, attaching the second end of the actuation means to the vehicular component by bolts, screws, clamps and/or the like, and then removing the vehicular component from the vehicle by sequentially or simultaneously operating the actuation means to manoeuvre the vehicular component to a position substantially onto the trolley, and then, being able to remove the trolley from underneath the vehicle, such that the transmission may be then serviced.

Likewise, the method of installing the transmission is performed by carrying out those steps in the opposite order.

Figure 5:
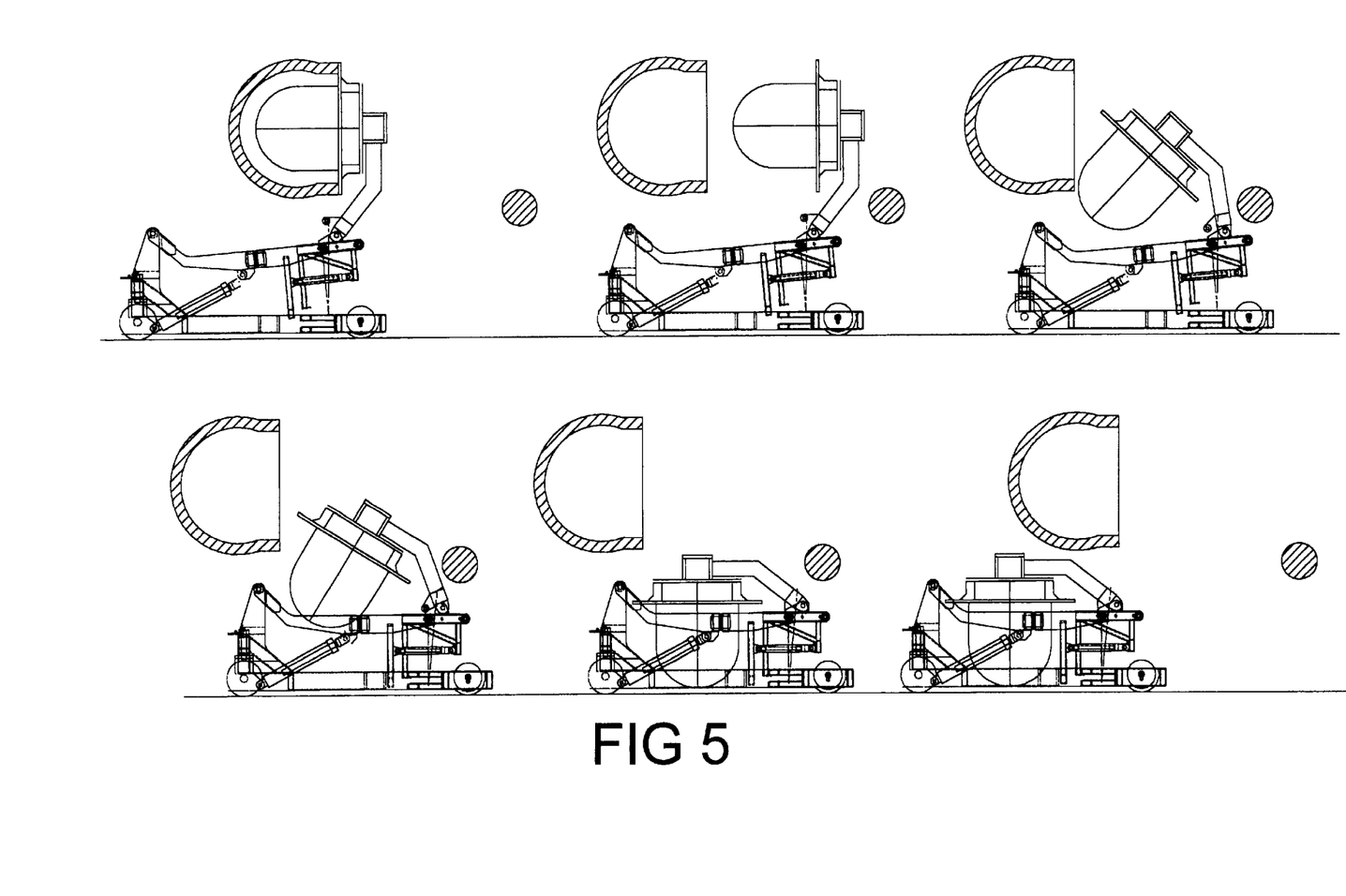
FIG. 5 illustrates how a differential unit may also be extracted utilising the device in accordance with the present invention; and, FIG. 6 illustrates, in FIGS. 6(a) and 6(b), isometric and plan vies of an alternative embodiment of a device in accordance with the present invention, similar to that shown in FIG. 1, but without the vehicular components attached.

FIG. 5 illustrates an alternative preferred embodiment of the invention, in this case, the device is utilised to install or remove a different vehicular component, in this case, the differential unit. Instead of attaching the saddle 14 shown in FIG. 3, the second end of the actuation means is provided with an alternative attachment for removable securement on to the differential, as shown. The differential may then be moved out of the differential housing, and likewise, with appropriate tilting and manoeuvring of the arms and the trolley, the differential unit may be extracted from the vehicle for servicing.

It will be appreciated by persons skilled in the art that, whilst a particular embodiment of the device is illustrated, utilising a trolley and an actuation means, numerous variations and modifications may be made to such a device whilst still performing the function of the device, that is, the extraction of vehicular components from vehicles in a position substantially underneath the vehicle.

It will also be appreciated that whilst the installation of and removal of a transmission unit and differential are described hereinbefore, that other vehicular components may likewise be removed or installed from vehicles by appropriate attachment of those components to the second end of the actuation means, in a similar manner, and as such should also be considered to fall within the spirit of this invention.

These and all other variations and modifications to the present invention which become obvious to persons skilled in the art, and which enable the function of the device embodied by the present invention to still be effectively performed, should be considered to fall within the scope of the invention as broadly hereinbefore described and as hereinafter claimed.

What is claimed is:

1. A device for removal/installation of a vehicular component from/on a vehicle, said device including:
    trolley means for moving said device over a substrate surface;
    a saddle device adapted to be connected to said vehicular component in a removable manner, said saddle device including:
       a roller; and
       a guide sleeve for removably attaching to said vehicular component, said guide sleeve including a guide channel for receiving said roller; and
    actuation means for maneuvering said vehicular component with respect to said vehicle, said actuation means including a first end attached to said trolley means and a second end attached to said saddle device, whereby, when said vehicular component is attached to said second end of said actuation means by means of said saddle device, said vehicular component is maneuvered between an installed position where said vehicular component is installed on said vehicle and an uninstalled position where said vehicular component is provided substantially on said trolley means for movement below said vehicle.

2. The device of claim 1, wherein said vehicle is a truck, tractor, earthmoving vehicle or mining equipment vehicle.

3. The device of claim 2 wherein said vehicular component is a differential.

4. The device of claim 2 wherein said vehicular component is a transmission.

5. The device of claim 1, wherein said actuation means includes a pair of articulated arms, one on substantially each side of said trolley means.

6. The device of claim 5, wherein each of said arms includes a plurality of pivotally connected arm members.

7. The device of claim 6, wherein each of said members is movable by means of an actuator.

8. The device of claim 7 wherein said actuator is a hydraulic cylinder.

9. The device of claim 7 wherein said actuator is a motor.

10. The device of claim 1, wherein said saddle device includes a pair of spaced apart saddle components adapted to surround and removably attach to said vehicular component.

11. The device of claim 1, wherein said trolley means is a trolley that is substantially elongated and lowstrung in shape and provided with roller means for movement thereof over the substrate surface.

* * * * *

UNITED STATES PATENT AND TRADEMARK OFFICE
CERTIFICATE OF CORRECTION

PATENT NO. : 6,640,408 B2
DATED : November 4, 2003
INVENTOR(S) : Robert Ian Hedley and Scott Johnson It is certified that error appears in the above-identified patent and that said Letters Patent is hereby corrected as shown below:

Title page,
Item [73], Assignee, delete "Jostoy Pty Ltd." and insert -- Justoy Pty Ltd. --

Column 1,
Line 39, delete "manocuvred" and insert -- manoeuvred --

Column 2,
Line 48, delete "filly" and insert -- fully --

Column 6,
Lines 12, 17, 27 and 31, delete the comma after "1"
Line 20, delete the comma after "5"
Line 22, delete the comma after "6"

Signed and Sealed this

Eleventh Day of May, 2004

JON W. DUDAS
*Acting Director of the United States Patent and Trademark Office*